United States Patent
Snapp

(10) Patent No.: US 10,869,178 B1
(45) Date of Patent: Dec. 15, 2020

(54) EMERGENCY LOCATION SERVICE

(71) Applicant: West Corporation, Omaha, NE (US)

(72) Inventor: John L. Snapp, Everett, WA (US)

(73) Assignee: West Corporation, Omaha, NE (US)

( * ) Notice: Subject to any disclaimer, the term of this patent is extended or adjusted under 35 U.S.C. 154(b) by 0 days.

(21) Appl. No.: 16/386,430

(22) Filed: Apr. 17, 2019

(51) Int. Cl.
*H04W 4/90* (2018.01)
*H04W 4/029* (2018.01)

(52) U.S. Cl.
CPC ............ *H04W 4/90* (2018.02); *H04W 4/029* (2018.02)

(58) Field of Classification Search
CPC ....... H04W 4/90; H04W 4/029; H04W 64/00; H04W 76/50; H04L 64/1016; H04M 11/04; H04M 3/5116
See application file for complete search history.

(56) References Cited

U.S. PATENT DOCUMENTS

| | | | | |
|---|---|---|---|---|
| 2007/0298793 A1* | 12/2007 | Dawson | ............... | H04W 76/12 455/435.1 |
| 2009/0061863 A1* | 3/2009 | Huggett | ............... | H04L 63/101 455/434 |
| 2011/0131197 A1* | 6/2011 | Nielsen | ............... | H04W 4/025 707/713 |
| 2013/0303104 A1* | 11/2013 | Venkatachalam | ....... | H04W 4/90 455/404.1 |
| 2014/0307858 A1* | 10/2014 | Li | .................... | H04M 3/42008 379/37 |
| 2017/0156043 A1* | 6/2017 | Li | .......................... | H04W 4/90 |

\* cited by examiner

*Primary Examiner* — Quoc Than N Vu

(57) ABSTRACT

An emergency location server may receive push location messages from a handset as the handset initiates a call to a public safety answering point (PSAP). The PSAP may request the location information from the location server by identifying the MSISDN of the handset. If the push message does not contain an MSISDN, the location server may send a message, e.g. SRI-SM message, to the home network of the handset to retrieve the MSISDN and associate the MSISDN with the location information in the push location message. This enables the location server to provide location responses to the PSAP even when the handset is unaware of its MSISDN.

20 Claims, 4 Drawing Sheets

EMERGENCY LOCATION SERVICE

FIELD OF THE INVENTION

This disclosure relates to systems and methods for extracting location information from a caller to an emergency service to enable the emergency service to direct emergency response resources to the location.

BACKGROUND OF THE INVENTION

Public safety answering points (PSAP)s (also referred to as public safety access points) are emergency call centers, e.g. for a 9-1-1 number, for receiving emergency calls from the public and for coordinating an emergency response, including routing the appropriate emergency service(s) to the location of the emergency. In a legacy system such as for landline based calls, an operator at the PSAP would query an emergency caller as to their location and route the emergency services, e.g. fire, ambulance, police, etc. to the specified location. With the advent of mobile phones, it became possible to get at least a general location of the caller based on the mobile tower(s) that were servicing the caller's phone.

Virtually all current day mobile phones operate a location service that uses satellite and other location determining systems to provide accurate coordinates of the phone in very quick time. Some mobile phone systems are moving towards utilizing the location services within the phone for 9-1-1 locations when a mobile device detects a 9-1-1 request for assistance is initiated. When an emergency service number (e.g. 911) of a PSAP is dialed, the phone pushes its location to a server and the server communicates with the PSAP to supply the GPS coordinates of the phone. Typically, the transaction occurs using the Mobile Station International Subscriber Directory Number (MSISDN) of the user equipment (also referred to as the Mobile Station, phone, device, etc.). However, devices are universally known by their International Mobile Subscriber Identity (IMSI), with not all devices being aware of their MSISDN. Therefore, what is required is a system and method for providing push emergency location services for devices that are not MSISDN aware.

SUMMARY OF THE INVENTION

An emergency location server may receive push location messages from a handset as the handset initiates a call to a public safety answering point (PSAP). The PSAP may request the location information from the location server by identifying the MSISDN of the handset. If the push message does not contain an MSISDN, the location server may send a message, e.g. SRI-SM message, to the home network of the handset to retrieve the MSISDN and associate the MSISDN with the location information in the push location message. This enables the location server to provide location responses to the PSAP even when the handset is unaware of its MSISDN.

In one aspect of the disclosure, there is provided a server comprising at least one processor and at least one memory operatively associated with the processor. The at least one processor may be programmed to receive an emergency location service message from a user equipment that indicates a location of the user equipment, send a query to a home network of the user equipment for a Mobile Station International Subscriber Directory Number (MSISDN) for the user equipment, receive a MSISDN for the user equipment from the home network in response to the query, and associate the received MSISDN from the home network with the location of the user equipment.

In one aspect of the disclosure, there is provided a method comprising receiving into a location server, an emergency location service message from a user equipment that indicates a location of the user equipment; sending a query from the location server to a home network of the user equipment for a Mobile Station International Subscriber Directory Number (MSISDN) for the user equipment; receiving, into the location server, an MSISDN for the user equipment from the home network in response to the query; and associating, within the location server, the received MSISDN from the home network with the location of the user equipment.

In one aspect of the disclosure, there is provided a non-transitory computer readable medium comprising instructions, that when read by a processor, cause the processor to perform receiving into a location server, an emergency location service message from a user equipment that indicates a location of the user equipment; sending a query from the location server to a home network of the user equipment for a Mobile Station International Subscriber Directory Number (MSISDN) for the user equipment; receiving, into the location server, an MSISDN for the user equipment from the home network in response to the query; and associating, within the location server, the received MSISDN from the home network with the location of the user equipment.

BRIEF DESCRIPTION OF THE DRAWINGS

Reference will now be made, by way of example only, to specific embodiments and to the accompanying drawings in which.

DETAILED DESCRIPTION OF THE INVENTION

In many existing emergency call centers, PSAPs and the like, the mobile number (MSISDN) is used by the 9-1-1 authority to identify the call but often the actual mobile device does not know that number. The mobile device is universally known by its IMSI. For centers and PSAPs that utilize location data from a location service, the use of the MSISDN can prevent the location service from being utilized across all devices.

Figure 1:
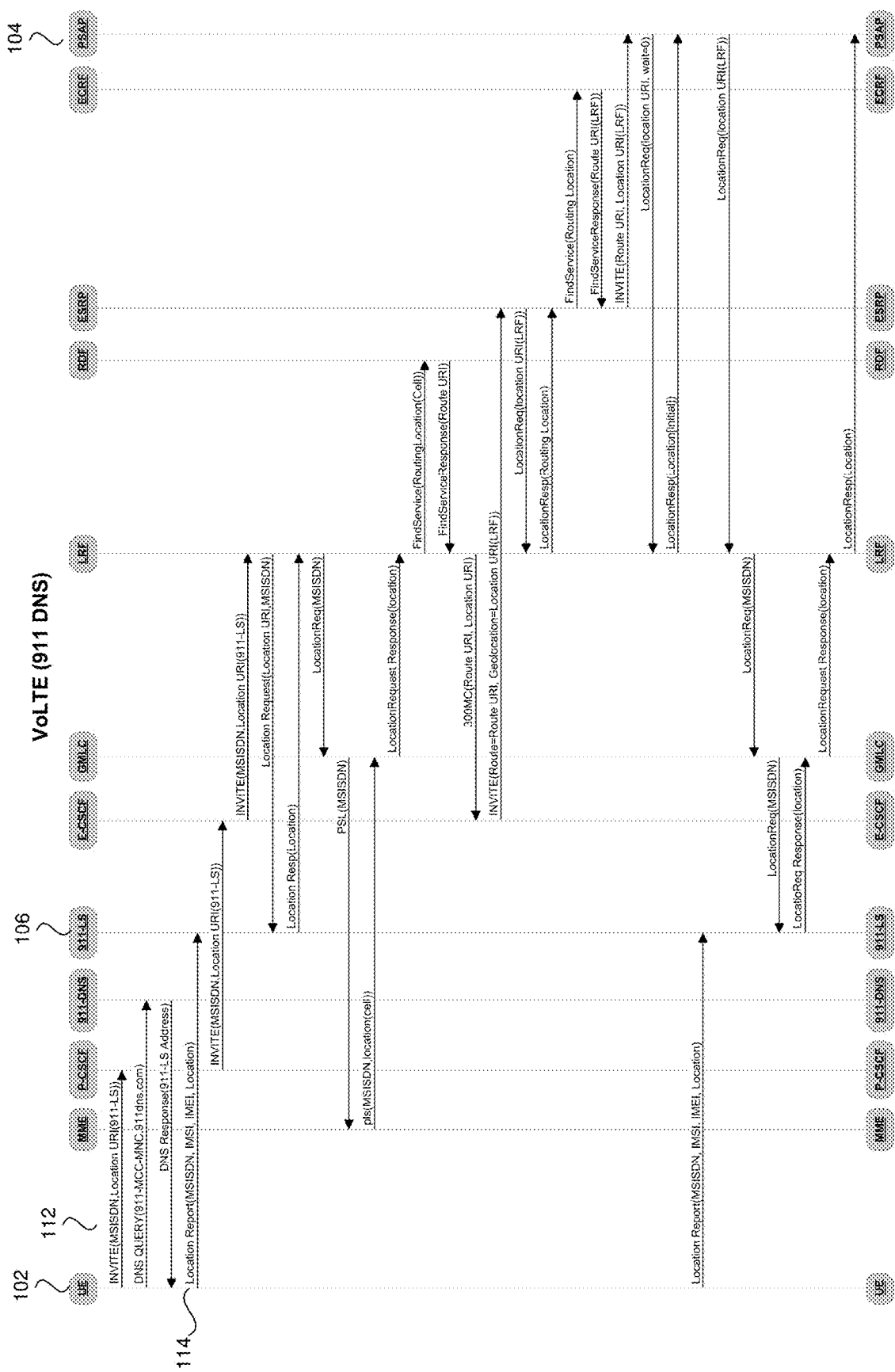
FIG. 1 shows a message diagram of a prior art emergency location service.

In FIG. 1, there is shown a message flow 100 for an example of an emergency location service. It can be seen that when the user equipment 102 activates a call 112 to a PSAP 104 or similar emergency service, there is a parallel push of the device location 114 to a server 106. Throughout the message flow 100, it can be seen that the MSISDN of the device is communicated, in particular in both the original call message 112 and the initial location push message 114. Whether a user equipment is aware of its MSISDN may be dependent on the device, operating system, carrier or other factors. The lack of awareness of the MSISDN can restrict the implementation and use of some emergency location services for some devices.

Figure 2:
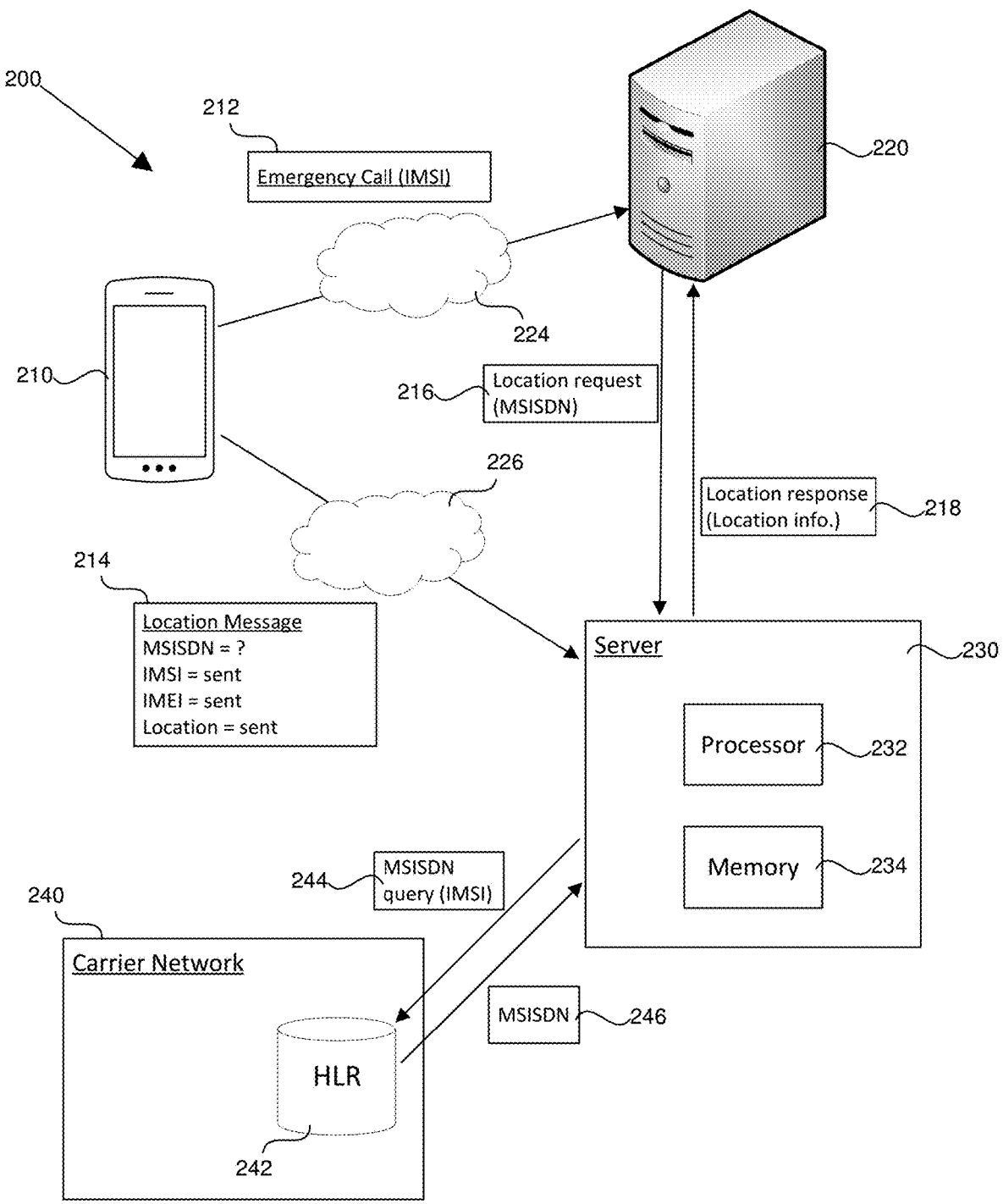
FIG. 2 shows a system diagram for providing emergency location services for MSISDN unaware devices.

FIG. 2 depicts an example embodiment that can allow a device that is not aware of its MSISDN to push its location to a PSAP or similar emergency call service. The system 200 of FIG. 2 shows a user equipment 210 that is able to send an emergency call 212 towards a PSAP 220 through a communications network 224. The call may be placed to the PSAP 220 using any suitable call methodology using any suitable communications network. The call may be a mobile telephone call using mobile telephone networks or may be a data call using data networks, the Internet, etc. Various protocols may be supported including, without limitation, GSM, Voice over Long-Term-Evolution (LTE) (VoLTE), Session Initiation Protocol (SIP), IP protocols, etc. The system may be implemented domestically within the USA or configured for International protocols and communication methods. The particular method or protocol by which the PSAP 220 receives the emergency call 212 from the user equipment 210 is not considered important to the present embodiments.

The PSAP 220, upon receipt of the emergency call, may send a location request message 216 to a location server 230 to obtain location information for the user equipment 210. Typically, the location request message 216 generated by the PSAP 220 identifies the user equipment by its MSISDN which the carrier attaches to the call.

When the phone 210 detects an outward emergency call 212 being placed, an application on the phone triggers a location push message 214 to the location server 230 through a communications network 226. The communications network 226 is a data network that is able to communicate location data of the location message 214. The communications network 226 may be the same as the communications network 224 and/or may have some shared components and functionality with the communications network 224. Alternatively, the communications network 226 may be separate and distinct from the communications network 224.

The location server 230 may include a processor 232, memory 234, program instructions and other computing components and modules for operating as a server, including communication modules, power modules, etc., as would be understood by the person skilled in the art.

The server 230 is programmed to receive the location message 214 from the user equipment 210 and to receive a location request message 216 from the PSAP 220. If the location message 214 originates from an MSISDN aware device and includes the MSISDN, then the location server 230 is able to lookup the location message 214 using the MSISDN received from the PSAP and return the associated location information to the PSAP 220 in a location response message 218.

As stated above, not all devices are aware of their MSISDN and thus not all location messages will include the MSISDN, thereby preventing the lookup procedure from returning a useful result. To enable the location server 230 to handle location requests for devices that are not MSISDN aware, the location server may be programmed to process a location message by first determining whether the location message includes the MSISDN. The location server 230 may be programmed to respond to a location message 214 that does not contain the MSISDN of the user equipment by sending an MSISDN query 244 to the home location register (HLR) (or Home Subscriber Service) 242 of the home carrier network 240 for the user equipment. The MSISDN query 244 may indicate another identity of the user equipment extracted by the location server 230 from the location message 214, such as the IMSI.

The HLR/HSS 242 provides the MSISDN for the user equipment to the location server in an MSISDN query response message 246. The location server 230, upon receipt of the MSISDN response message associates the MSISDN with the location message 214 so that the location server 230 is able to perform the lookup of the location information when the location server 230 receives a location request bearing an MSISDN 216 from the PSAP 220.

In one embodiment, the location server 230 queries the carrier's master home database (HLR/HSS) using a Send-RoutingInfoforShortMessage (SRI-SM) or similar routing information request, that is typically used to route an SMS message, to gain the information that is needed to associate the pushed emergency location with the actual emergency number. The HLR/HSS is already configured to respond to such routing requests with a response that includes the MSISDN for the mobile terminal and thus no substantial change in configuration of the HLR/HSS 242 or carrier network 240 is required.

Figure 3:
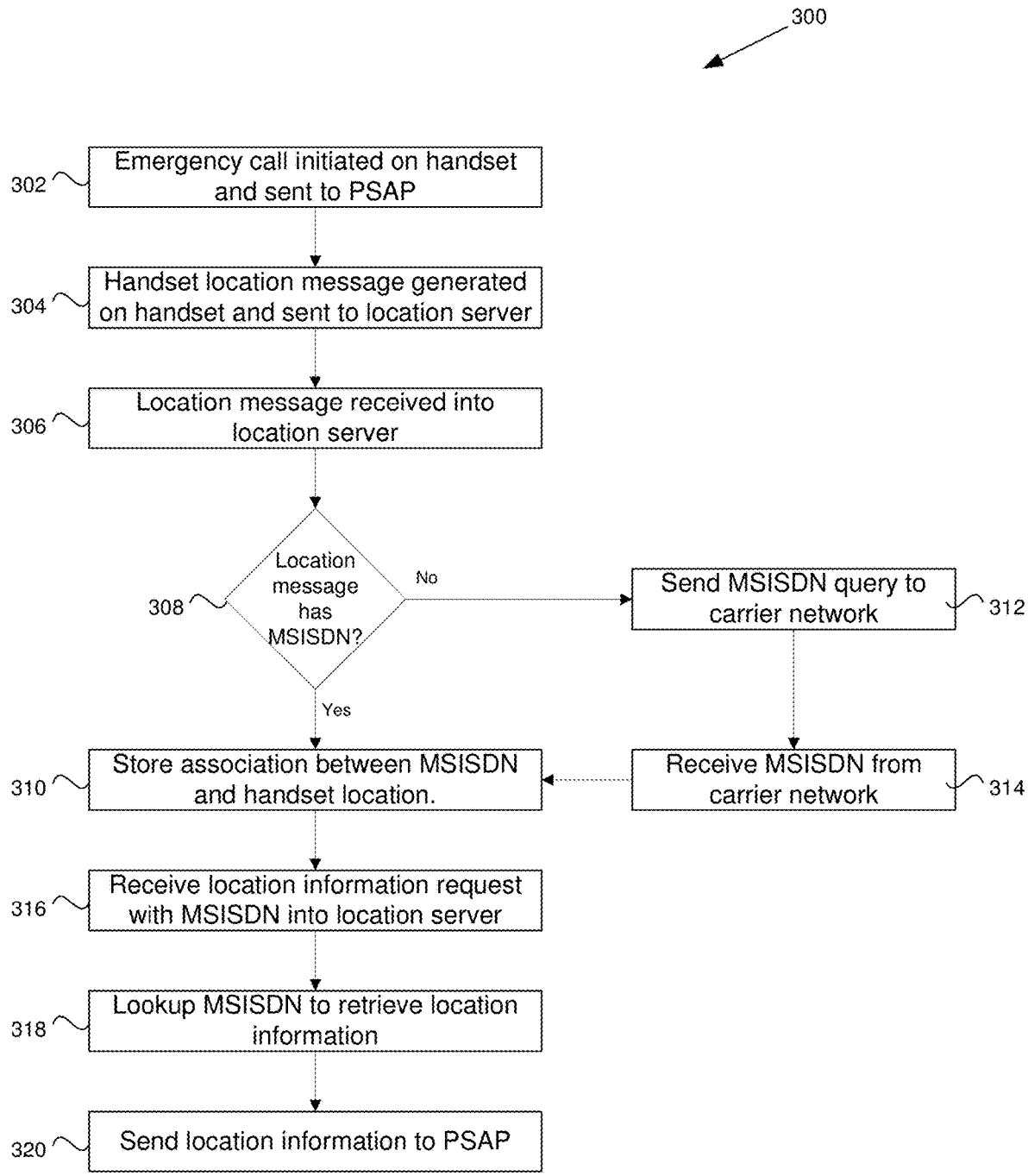
FIG. 3 depicts a method for providing emergency location services.

FIG. 3 shows a flowchart 300 of a method in accordance with an embodiment of the present disclosure. At step 302, an emergency call is initiated on a handset (user equipment) and sent to a PSAP identified by the emergency call number, (e.g. 9-1-1).

At step 304, an emergency service application within the handset detects the emergency call and pushes a location message to a location server, the address of which is pre-configured into the handset, e.g. within the emergency service application, carrier data, etc.

At step 306, the pushed location message is received into the location server and the location server determines if the location message contains the MSISDN of the handset (determination 308). If the location message contains the MSISDN, the MSISDN and location can be associated within the location server (storage step 310), awaiting a location query from the PSAP. In one embodiment, the location server may simply store the location message including the MSISDN and the handset location.

If the location message does not contain the MSISDN, the location server sends an MSISDN query (e.g. SRI-SM) (step 312) to the home carrier network of the handset, identified from the location message. The location server receives the MSISDN query response including the MSISDN (step 314), moving to step 310 to store the association between the MSISDN of the handset and the location of the handset. In one embodiment, the location server may add the MSISDN to the location message and then store the location message including the MSISDN and the location data.

At step 316, the location server 230 may receive a location request indicating an MSISDN from the PSAP 220. The location server extracts the MSISDN from the location request and performs a lookup on the location server (step 318) to retrieve the location of the handset associated with the MSISDN. The location server returns a response with the location information to the PSAP 220 (step 320).

Figure 4:
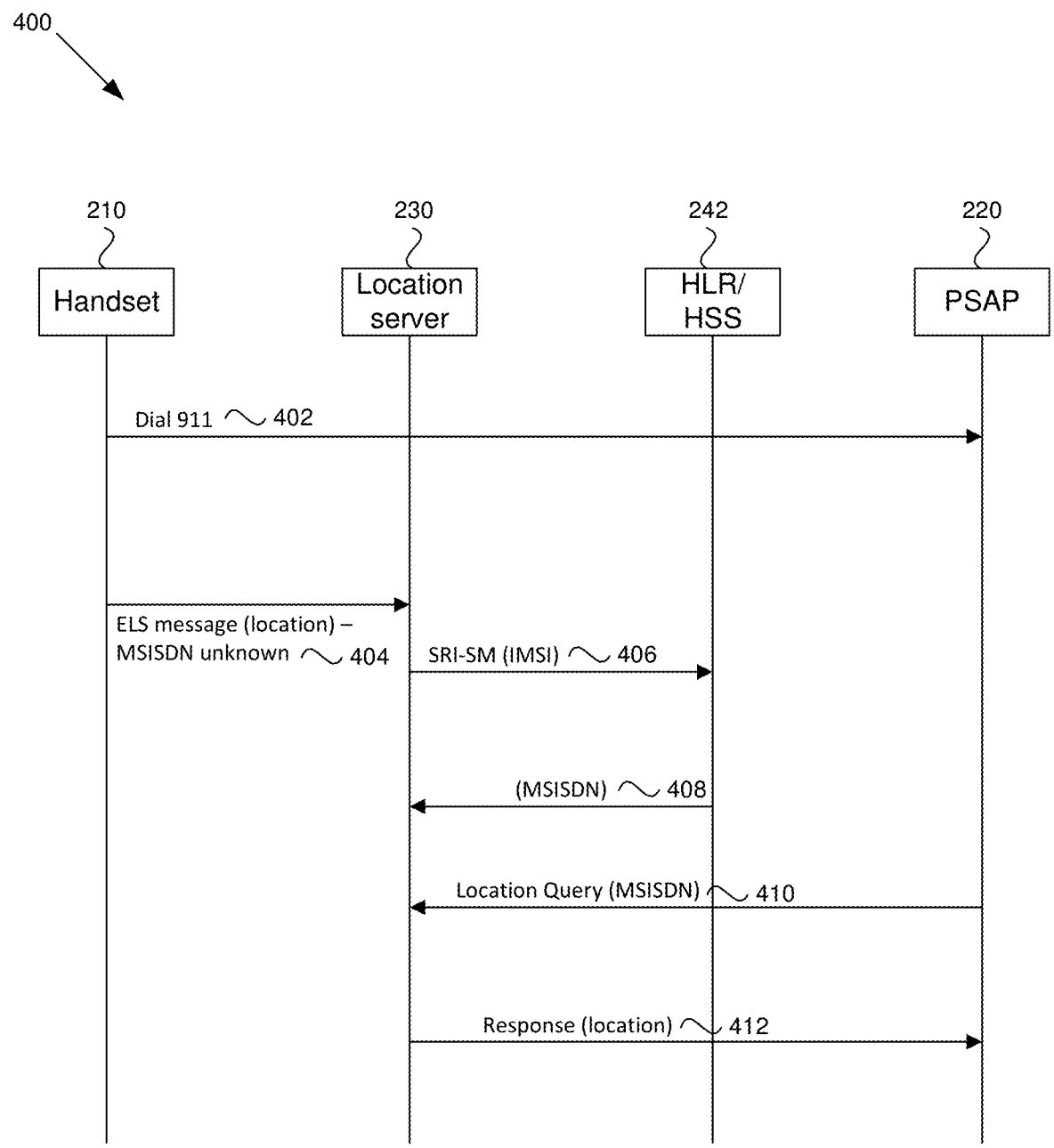
FIG. 4 is a message diagram for providing emergency location services.

A message diagram is depicted in FIG. 4. In the message flow 400, a handset 210 dials an emergency number 911 and connects a call 402, which may be a mobile based call, data based call, etc. to a PSAP 220. The handset also pushes an emergency location service message 404, e.g. a Google ELS message, to a location server 230 with the location of the handset but with the MSISDN unknown. The location server 230 acts upon receipt of an ELS message that is missing the MSISDN by sending an MSISDN query 406, e.g. an SRI-SM message, to the HLR/HSS 242 of the home network of the handset 210. The HLR/HSS responds with a message 408 containing the MSISDN.

When the location server 230 receives a location query 410 specifying an MSISDN from the PSAP, the location server responds 412 to the PSAP with the location information for the handset associated with the MSISDN.

Some of the advantages of the some of the present embodiments include a simple less complex implementation that can provide a fast and accurate location for public safety. The location can be provided quick enough that it can be utilized to route an emergency call. A further advantage is that a single solution can be implemented both domestically in the USA and Internationally and is consistent with i3 methodologies. The system and methods can support emergency location for Home and Roaming mobiles and can support location for Voice, text and future call types/technologies.

While the present embodiments are described with specific reference to the use of the MSISDN as the lookup key for a location query from the PSAP, there may be other configurations of PSAP that use other lookup keys that may be omitted in other configurations of location messages. The present embodiments are equally applicable to such configurations.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A server comprising:
   at least one processor and at least one memory operatively associated with the processor, the at least one processor programmed to:
   receive, from a user equipment having a Mobile Station International Subscriber Directory Number (MSISDN), an emergency location service message that indicates a location of the user equipment;
   identify that the emergency location service message does not include the MSISDN;
   send, to a home network of the user equipment, a query for the MSISDN based on the identification that the emergency location service message does not include the MSISDN;
   receive the MSISDN from the home network in response to the query; and
   associate the received MSISDN from the home network with the location of the user equipment.

2. The server of claim 1, programmed to:
   receive a location query for the location of the user equipment from a public safety answering point (PSAP), the location query specifying the MSISDN;
   use the location query MSISDN to lookup the location of the user equipment; and
   provide the location of the user equipment to the PSAP.

3. The server of claim 1, wherein the emergency location service message does not include the MSISDN for the user equipment.

4. The server of claim 1, programmed to determine if the location message contains an MSISDN.

5. The server of claim 1, wherein the query comprises an SRI-SM message.

6. The server of claim 5, wherein the SRI-SM message indicates an IMSI for the user equipment.

7. The server of claim 1, programmed to add an MSISDN received from the home network to the emergency service location message received from the user equipment and store the emergency service location message at the location server.

8. A method comprising:
   receiving, by a location server, an emergency location service message from a user equipment having a Mobile Station International Subscriber Directory Number (MSISDN), the emergency location service message indicating a location of the user equipment;
   identifying that the emergency location service message does not include the MSISDN;
   sending, via the location server, a query for the MSISDN based on the identifying that the emergency location service message does not include the MSISDN to a home network of the user equipment;
   receiving, by the location server, the MSISDN in response to the query; and
   associating, within the location server, the received MSISDN from the home network with the location of the user equipment.

9. The method of claim 8, comprising:
   receiving, into the location server, a location query for the location of the user equipment from a public safety answering point (PSAP), the location query specifying the MSISDN;
   using the location query MSISDN, by the location server, to lookup the location of the user equipment; and
   providing the location of the user equipment to the PSAP.

10. The method of claim 8, wherein the emergency location service message does not include the MSISDN for the user equipment.

11. The method of claim 8, comprising:
    determining if the location message contains an MSISDN.

12. The method of claim 8, wherein the query comprises: an SRI-SM message.

13. The method of claim 12, wherein the SRI-SM message indicates an IMSI for the user equipment.

14. The method of claim 8, comprising:
    adding an MSISDN received from the home network to the emergency service location message received from the user equipment and storing the emergency service location message at the location server.

15. A non-transitory computer readable medium comprising instructions that when executed by a processor cause the processor to perform:
    receiving, by a location server, an emergency location service message from a user equipment having a Mobile Station International Subscriber Directory Number (MSISDN), the emergency location service message indicating a location of the user equipment;

identifying that the emergency location service message does not include the MSISDN;

sending, via the location server, a query for the MSISDN based on the identifying that the emergency location service message does not include the MSISDN to a home network of the user equipment;

receiving, by the location server, the MSISDN in response to the query; and associating, within the location server, the received MSISDN from the home network with the location of the user equipment.

16. The non-transitory computer readable medium of claim 15, comprising instructions that when executed by the processor, cause the processor to perform:

receiving, into the location server, a location query for the location of the user equipment from a public safety answering point (PSAP), the location query specifying the MSISDN;

using the location query MSISDN, by the location server, to lookup the location of the user equipment; and providing the location of the user equipment to the PSAP.

17. The non-transitory computer readable medium of claim 15, wherein the emergency location service message does not include the MSISDN for the user equipment.

18. The non-transitory computer readable medium of claim 15, comprising instructions that when executed by the processor, cause the at least one processor to perform:

determining if the location message contains an MSISDN.

19. The non-transitory computer readable medium of claim 15, wherein the query comprises an SRI-SM message.

20. The non-transitory computer readable medium of claim 19, wherein the SRI-SM message indicates an IMSI for the user equipment.

* * * * *